(No Model.)
C. W. & J. E. HARMON & C. L. BOYD.
ICE CREAM MOLD AND DIPPER.
No. 572,987.　　　　　　　　　　Patented Dec. 15, 1896.
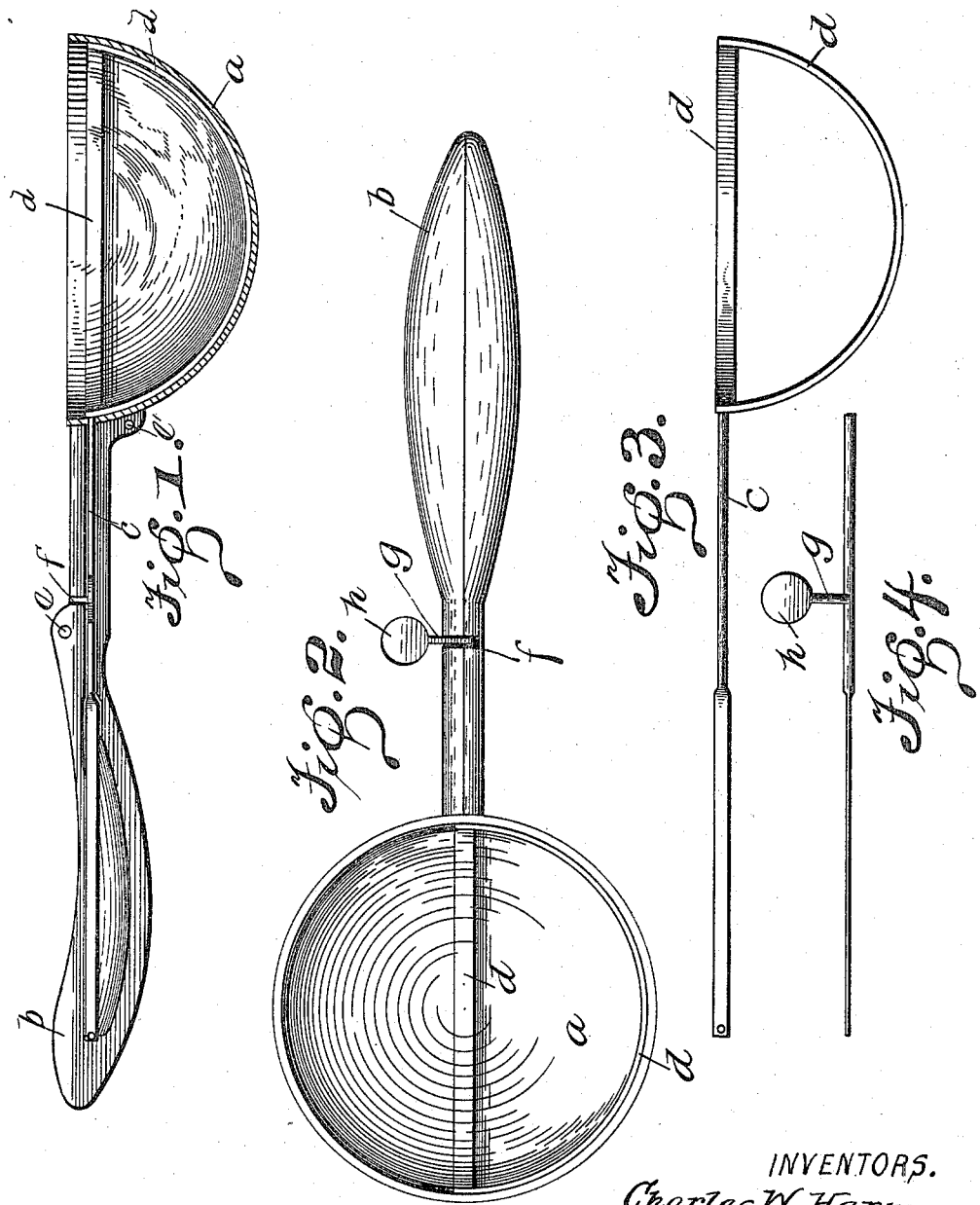
WITNESSES:
A. R. Appleman Jr.
A. M. Wilson
INVENTORS.
Charles W. Harmon.
James E. Harmon.
and Charles L. Boyd.
BY
Henry C. Evert
ATTORNEY.

UNITED STATES PATENT OFFICE.

CHARLES W. HARMON, JAMES E. HARMON, AND CHARLES L. BOYD, OF ALLEGHENY, PENNSYLVANIA.

ICE-CREAM MOLD AND DIPPER.

SPECIFICATION forming part of Letters Patent No. 572,987, dated December 15, 1896.

Application filed April 9, 1896. Serial No. 586,860. (No model.)

*To all whom it may concern:*

Be it known that we, CHARLES W. HARMON, JAMES E. HARMON, and CHARLES L. BOYD, citizens of the United States of America, residing at Allegheny, in the county of Allegheny and State of Pennsylvania, have invented certain new and useful Improvements in Ice-Cream Molds and Dippers, of which the following is a specification, reference being had therein to the accompanying drawings.

This invention relates to certain new and useful improvements in ice-cream molds and dippers, and has for its object to construct a mold and dipper which can be operated with one hand, while in some of the ordinary constructions both hands are required, one to hold the dipper and the other to operate the cutters.

A further object of the invention is to construct a mold and dipper of the above-described class that will be extremely simple in its construction, strong, durable, and effectual in its operation, and comparatively inexpensive to manufacture.

A still further object of the invention is to construct a mold and dipper as above described that may be employed for dishing various substances of the class above stated, and that will be constructed in such a manner that there will be no delicate parts to get out of order or to come in contact with the substances on which it is being used.

With the above and other objects in view the invention finally consists in the novel construction, combination, and arrangements of parts to be hereinafter more specifically described, and particularly pointed out in the claims.

In describing the invention in detail, reference is had to the accompanying drawings, forming a part of this specification, and wherein like letters of reference indicate similar parts throughout the several views, in which—

Figure 1 is a view showing our device in central vertical section. Fig. 2 is a top plan view. Fig. 3 is a side view of the cutters and spring-rod. Fig. 4 is a plan view of the rod and operating-lever.

In the drawings, *a* represents the mold, which in the drawings is shown as semicircular in form, and has secured thereto a handle *b*, composed of two sections, having a groove through the center thereof for the reception of the spring-rod *c*, one end of which extends into the mold or dipper and carries the cutters *d d*. The rear half of this rod is flattened, as shown in Figs. 1 and 3, so as to allow the same to spring, and is rigidly secured near the outer end of the handle by a rivet, which also fastens the two sections of the handle together. In order to bind the two sections of the handle firmly together, rivets can also be inserted through the aperture *e* and *e'*, as shown in Fig. 1 of the drawings.

A slot *f* is provided in the top of each section of the handle a short distance in front of the portion of the handle designed for the operator's hand, and a lever *g* is secured to the rod *c* and extends through this slot and carries on its upper end a knob or button *h* to receive the thumb of the operator.

The operation of our improved ice-cream mold and dipper will be readily apparent from the views of the same which we have shown in the drawings.

Assuming that the parts have all been secured in their respective positions, the operator grasps the handle *b*, and when the lever *g* is not depressed the cutters will be in their normal position, as shown in Figs. 1 and 2, one across the bottom of the mold at the center thereof and the other around one-half the inner face at the side, thereby presenting no obstacle to the dipper when forced in the cream. The thumb is then placed on the knob or button *h* and the same pressed toward the fingers of the hand, which will cause the rod *c*, by reason of its flat portion, to turn or spring sufficiently to rotate the cutters, each of said cutters operating over one-half of the inner surface of the mold, or describing a quarter-circle, thus covering the entire inner surface of the mold and loosening the substance therefrom and permitting it to fall into the plate or saucer provided therefor when the mold is inverted over the same. When the pressure on the thumb knob or button is released, the spring-rod will retract, causing the cutters, by reason of their being rigidly secured thereto, to assume their normal position again, and the dipper is again ready for use.

It will be observed that many advantages will be obtained by a mold of the description, and also that various other changes may be made in the details of construction without departing from the general spirit of our invention.

Having fully described our invention, what we claim as new, and desire to secure by Letters Patent, is—

1. In combination a mold provided with a hollow handle, cutters working in the mold and a torsion spring-rod located and secured within the handle, and a lever for operating the cutters, as and for the purpose described.

2. In an ice-cream mold, a semicircular mold, a handle composed of two sections secured together and to the mold, a spring-rod in said handle rigidly secured near the outer end of the handle, said rod having a flattened portion to form the spring, cutters rigidly secured to the end of the rod extending in the mold and an operating-lever secured to the rod and operating through a slot in the handle said lever carrying a pressure knob or button, substantially as shown and described.

In testimony whereof we affix our signatures in presence of two witnesses.

CHARLES W. HARMON.
JAMES E. HARMON.
CHARLES L. BOYD.

Witnesses:
 ALFRED M. WILSON,
 H. E. SEIBERT.